(12) United States Patent
Suzuki et al.

(10) Patent No.: US 9,800,751 B2
(45) Date of Patent: Oct. 24, 2017

(54) PROCESSING APPARATUS AND PROCESSING METHOD FOR SUSPENDING PROCESSING IN RESPONSE TO DETECTION OF A PREDETERMINED SOUND

(71) Applicant: FUJI XEROX CO., LTD., Tokyo (JP)

(72) Inventors: Toru Suzuki, Kanagawa (JP);
Masafumi Ono, Kanagawa (JP);
Kunitoshi Yamamoto, Kanagawa (JP);
Manabu Hayashi, Kanagawa (JP);
Naoya Nobutani, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/051,150

(22) Filed: Feb. 23, 2016

(65) Prior Publication Data
US 2017/0041485 A1 Feb. 9, 2017

(30) Foreign Application Priority Data

Aug. 4, 2015 (JP) .................................. 2015-153992

(51) Int. Cl.
*G06F 3/12* (2006.01)
*H04N 1/00* (2006.01)
*H04N 1/04* (2006.01)
*G10L 15/00* (2013.01)

(52) U.S. Cl.
CPC ..... *H04N 1/00925* (2013.01); *H04N 1/00015* (2013.01); *H04N 1/00037* (2013.01); *H04N 1/00058* (2013.01); *H04N 1/00312* (2013.01); *H04N 1/04* (2013.01); *G10L 15/00* (2013.01); *H04N 2201/0094* (2013.01)

(58) Field of Classification Search
None
See application file for complete search history.

(56) References Cited

U.S. PATENT DOCUMENTS

| 6,570,605 | B1 * | 5/2003 | Kashiwazaki | ....... G06K 15/005 |
| | | | | 347/264 |
| 2004/0021899 | A1 * | 2/2004 | Jost | ........................... G06F 3/16 |
| | | | | 358/1.15 |

FOREIGN PATENT DOCUMENTS

| JP | 2001-312292 A | 11/2001 |
| JP | 2005-165203 A | 6/2005 |
| JP | 2015-041123 A | 3/2015 |

\* cited by examiner

*Primary Examiner* — Paul F Payer
(74) *Attorney, Agent, or Firm* — Oliff PLC

(57) ABSTRACT

A processing apparatus includes a processing unit, an instruction unit, a detection unit, and a suspension unit. The processing unit performs a process that is predetermined. The instruction unit gives an instruction to start the process to the processing unit. The detection unit detects a sound in the vicinity of the processing apparatus. The suspension unit suspends the process in a case where the detection unit detects a predetermined sound while the processing unit is performing the process.

10 Claims, 11 Drawing Sheets

PROCESSING APPARATUS AND PROCESSING METHOD FOR SUSPENDING PROCESSING IN RESPONSE TO DETECTION OF A PREDETERMINED SOUND

CROSS-REFERENCE TO RELATED APPLICATIONS

This application is based on and claims priority under 35 USC 119 from Japanese Patent Application No. 2015-153992 filed Aug. 4, 2015.

BACKGROUND

Technical Field

The present invention relates to a processing apparatus and a processing method.

SUMMARY

According to an aspect of the invention, there is provided a processing apparatus including a processing unit, an instruction unit, a detection unit, and a suspension unit. The processing unit performs a process that is predetermined. The instruction unit gives an instruction to start the process to the processing unit. The detection unit detects a sound in the vicinity of the processing apparatus. The suspension unit suspends the process in a case where the detection unit detects a predetermined sound while the processing unit is performing the process.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below. The description will be given herein by mainly using a copier as a processing apparatus according to the exemplary embodiments of the present invention.

Figure 1:
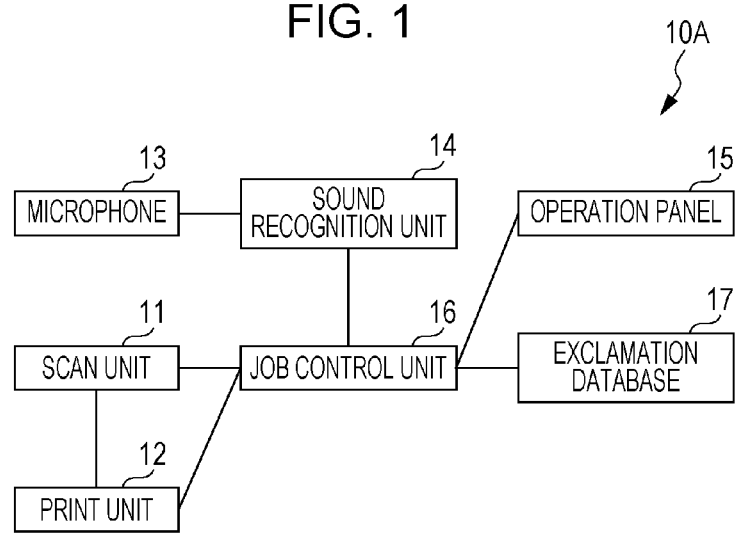
FIG. 1 is a block diagram illustrating a configuration of a copier, which is a processing apparatus according to a first exemplary embodiment of the present invention.

FIG. 1 is a block diagram illustrating a configuration of a copier 10A, which is a processing apparatus according to a first exemplary embodiment of the present invention.

The copier 10A illustrated in FIG. 1 includes a scan unit 11 and a print unit 12.

The scan unit 11 is a device that scans an image on an original and generates image data of the scanned image. The print unit 12 is a device that forms, on a sheet, an image based on the image data generated by the scan unit 11. The scan unit 11 converts an image on a sheet called an original into image data, whereas the print unit 12 converts image data into an image on a sheet. That is, both the scan unit 11 and the print unit 12 are devices that perform an operation including conversion between image data and an image on a sheet. Each of the scan unit 11 and the print unit 12 corresponds to an example of a processing unit according to an aspect of the invention.

The copier 10A further includes a microphone 13, a sound recognition unit 14, an operation panel 15, a job control unit 16, and an exclamation database 17.

The exclamation database 17 stores text data items, which are obtained by converting spontaneous utterances which the user unintentionally makes upon noticing an error in a user operation or an abnormal operation of the copier 10A into text. Examples of spontaneous utterances include "oops!", "uh-oh!", "gosh!", and "shoot!". In the first exemplary embodiment, the text data items of exclamations stored in the exclamation database 17 are each used as a text data item for an instruction to suspend a process performed by the processing unit (i.e., the scan unit 11 and the print unit 12).

The microphone 13 picks up a sound made by the user of the copier 10A and generates an audio signal. The microphone 13 corresponds to an example of a detection unit according to an aspect of the present invention.

The sound recognition unit 14 recognizes content of a sound represented by the audio signal generated by the microphone 13 and generates a text data item. The sound recognition unit 14 corresponds to an example of a recognition unit according to an aspect of the present invention.

The operation panel 15 accepts a user operation. The operation panel 15 corresponds to an example of an instruction unit and an example of a resuming unit according to an aspect of the present invention.

The job control unit 16 controls the copier 10A, such as controlling operations of the scan unit 11 and the print unit 12 in accordance with content of a user operation accepted by the operation panel 15. The job control unit 16 corresponds to an example of the instruction unit and an example of a suspension unit according to an aspect of the present invention.

Examples of control performed by the job control unit 16 include control in which it is determined whether a text data item derived from a sound picked up by the microphone 13 while the processing unit (the scan unit 11 or the print unit 12) is performing a process (i.e., a text data item recognized by the sound recognition unit 14 this time) matches any one of plural text data items stored in the exclamation database 17, and if a text data item matching the recognized text data item is found, the process being performed by the processing unit (the scan unit 11 or the print unit 12) is suspended.

Figure 2:
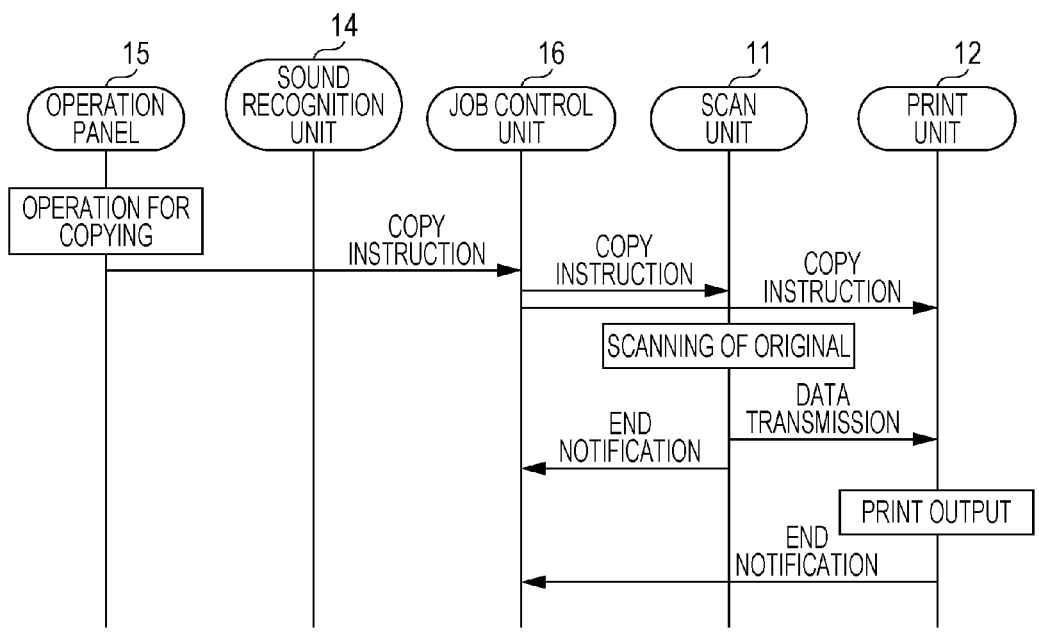
FIG. 2 is a ladder chart of a normal operation performed by the copier illustrated in FIG. 1.

FIG. 2 is a ladder chart of a normal operation performed by the copier 10A illustrated in FIG. 1.

The operation panel 15 accepts an instruction relating to a copy operation, such as the number of copies and the contrast, through a user operation for copying, and also accepts an instruction to start copying from the user. The copy instruction obtained through the operations performed on the operation panel 15 is sent from the operation panel 15 to the job control unit 16.

The job control unit 16 sends the copy instruction to the scan unit 11 and the print unit 12. In response to the copy instruction, the scan unit 11 scans an original. Specifically, the scan unit 11 scans an image on an original and generates image data of the scanned image. The scan unit 11 sends the generated image data to the print unit 12. The scan unit 11 then sends an end notification to the job control unit 16.

Upon receipt of the copy instruction from the job control unit 16 and the image data from the scan unit 11, the print unit 12 prints (outputs) an image based on the image data on a sheet. After finishing printing, the print unit 12 sends an end notification to the job control unit 16.

Figure 3:
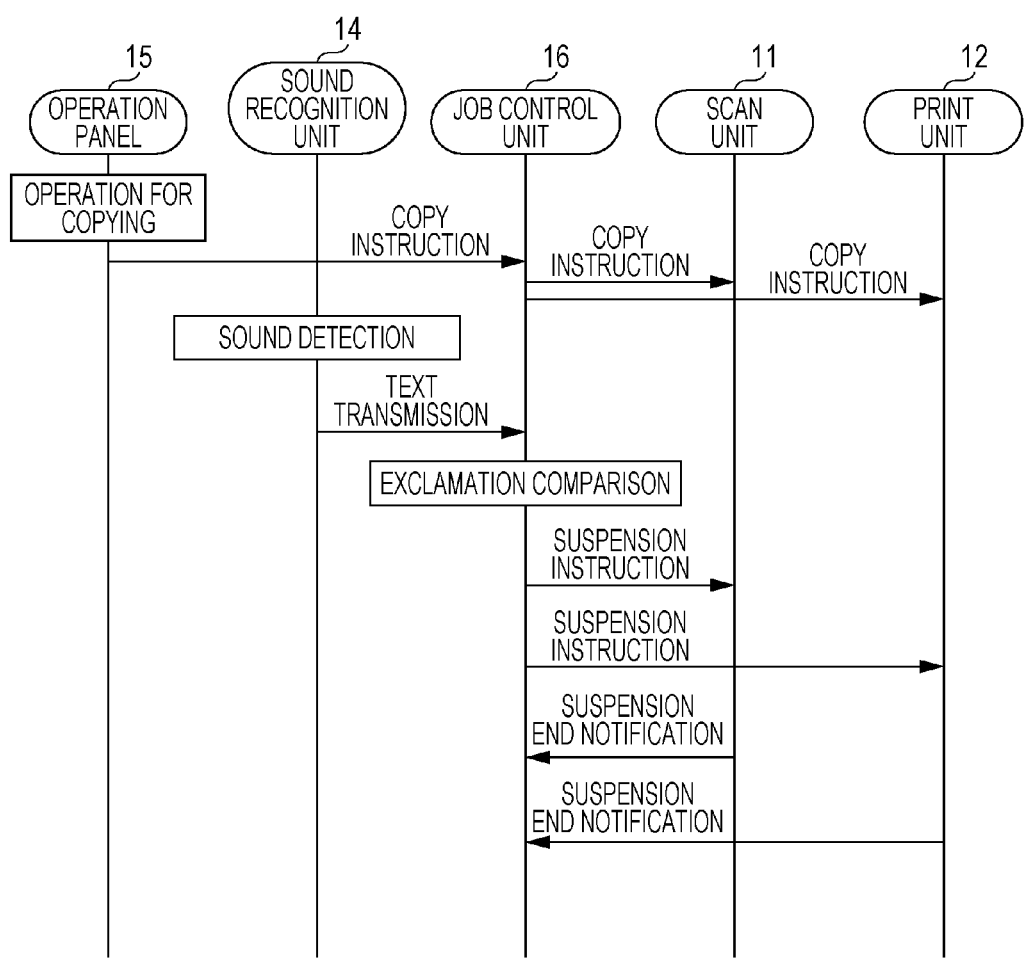
FIG. 3 is a ladder chart of the case where the copier illustrated in FIG. 1 detects a sound during the operation.

FIG. 3 is a ladder chart of the case where the copier 10A illustrated in FIG. 1 detects a sound during the operation.

As in the normal operation illustrated in FIG. 2, a copy instruction obtained through operations performed on the operation panel 15 is sent to the job control unit 16. The job control unit 16 sends the copy instruction to the scan unit 11 and the print unit 12. A duplicate description regarding the original scanning operation performed by the scan unit 11 and the printing operation performed by the print unit 12 is omitted here.

It is assumed in this case that the microphone 13 picks up a sound before an end notification is sent from the scan unit 11 or the print unit 12 to the job control unit 16, that is, while the scan unit 11 or the print unit 12 is operating. The sound recognition unit 14 converts the sound into a text data item and sends the text data item to the job control unit 16. The job control unit 16 then compares the text data item received from the sound recognition unit 14 with each one of the text data items of exclamations stored in the exclamation database 17 (see FIG. 1) to determine whether the text data item received from the sound recognition unit 14 matches any one of the plural text data items stored in the exclamation database 17. If a text data item that matches the received text data item is found, the job control unit 16 sends an instruction to suspend the operation to the scan unit 11 and the print unit 12. Then, in response to the suspension instruction, the scan unit 11 and the print unit 12 perform a suspending operation involving suspension of the operation, such as transporting a sheet that is in the middle of the transport path to the exit. After finishing the suspending operation, the scan unit 11 and the print unit 12 send a suspension end notification to the job control unit 16.

FIGS. 4A to 4D each illustrate a screen displayed on the operation panel 15 of the copier 10A illustrated in FIG. 1.

The operation panel 15 includes a state display portion 151, an instruction accepting portion 152, and a start button 153. The state display portion 151 displays the current state by using text. The instruction accepting portion 152 accepts an instruction relating to copying, such as an instruction regarding the number of copies. The start button 153 accepts an instruction to start copying. In addition, the microphone 13 (see also FIG. 1) is incorporated into the operation panel 15.

Figure 4A:
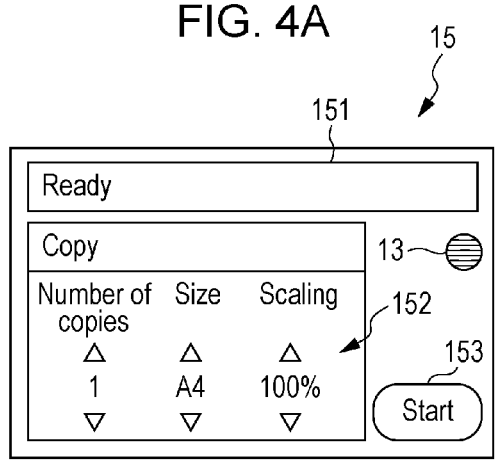
FIGS. 4A to 4D each illustrate a screen displayed on an operation panel of the copier illustrated in FIG. 1.

FIG. 4A illustrates the operation panel 15 when the copier 10A is ready to accept a user operation before performing a copy operation.

In FIG. 4A, the state display portion 151 displays "Ready". While "Ready" is displayed in the state display portion 151, a user operation for copying is accepted. In the instruction accepting portion 152, the "number of copies", the "size" of sheets used in copying, and the "scaling" of the copied image are set. FIG. 4A illustrates initial values, that is, the "number of copies" of 1, the "size" of A4, and the "scaling" of 100%. The user is allowed to change these settings from the initial values to desired values by performing an operation in the instruction accepting portion 152. The user places an original at the scan unit 11 and presses the start button 153, in response to which, the copy operation is started in accordance with the settings set in the instruction accepting portion 152. It is assumed in this case that the start button 153 is pressed with the initial values in FIG. 4A kept unchanged.

FIG. 43 illustrates the operation panel 15 during the copy operation.

Figure 4B:
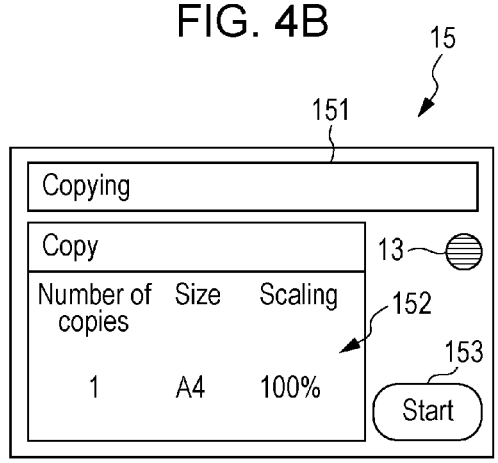

The copy operation is started in response to pressing of the start button 153 in the "Ready" state illustrated in FIG. 4A. In response to the start of the copy operation, "Copying" is displayed in the state display portion 151 as illustrated in FIG. 4B. The instruction accepting portion 152 is prohibited from accepting any user operation.

Figure 4C:
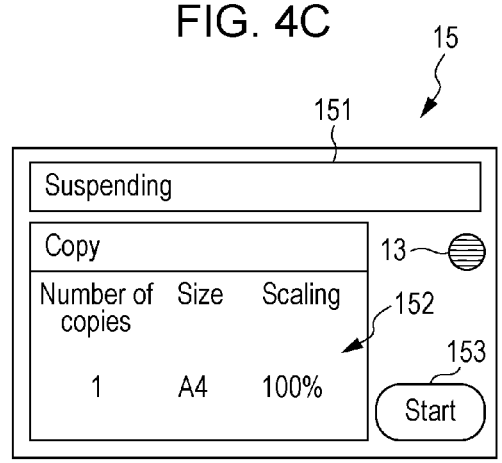

FIG. 4C illustrates the operation panel 15 when the copy operation is being suspended.

If a text data item obtained by sound recognition matches any one of the text data items stored in the exclamation database 17, an instruction to suspend the operation is sent to the scan unit 11 and the print unit 12. Then, "Suspending" is displayed in the state display portion 151 of the operation panel 15 as illustrated in FIG. 4C. In this way, the user is notified that the copy operation is suspended.

Figure 4D:
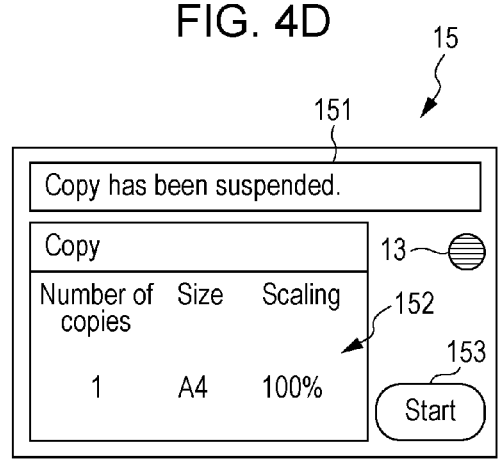

FIG. 4D illustrates the operation panel 15 in the case of suspension end.

In response to the suspension instruction, the scan unit 11 and the print unit 12 perform the suspending operation. After finishing the suspending operation, the scan unit 11 and the print unit 12 send the suspension end notification to the job control unit 16 (see FIG. 3). Then, the job control unit 16 instructs the operation panel 15 to display "Copy has been suspended." in the state display portion 151.

The state "suspension end" illustrated in FIG. 41J is the same as the state "ready" in terms of the internal state of the copier 10A. However, by displaying "Copy has been suspended.", the user is notified that the copy operation has been suspended.

After a predetermined period passes since display of "Copy has been suspended." illustrated in FIG. 4D has been started, the displayed message is changed to "Ready" illustrated in FIG. 4A. In addition, the state of the instruction accepting portion 152 is changed to be ready to accept a user operation.

Figure 5:
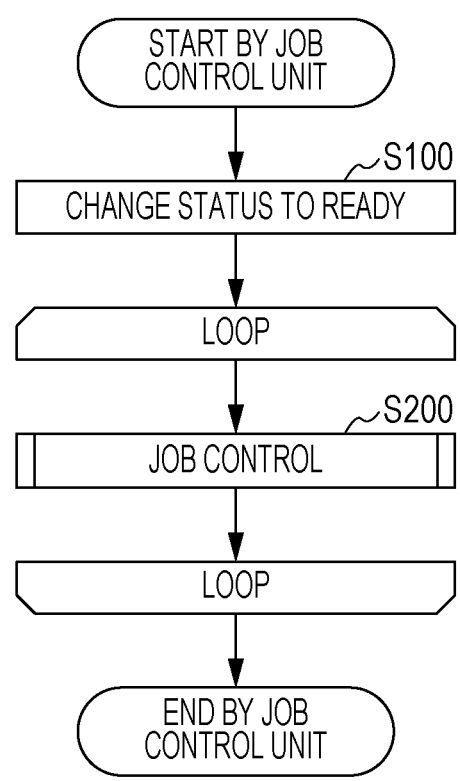
FIG. 5 is a flowchart illustrating a control operation performed by a job control unit illustrated in FIG. 1.

FIG. 5 is a flowchart illustrating a control operation performed by the job control unit 16 illustrated in FIG. 1.

After the job control unit 16 starts operating in response to power-on of the copier 10A or the like, the state is changed to "Ready" (step S100, see FIG. 4A). "Job control" (step S200) is repeatedly performed until the copier 10A completely stops operating due to power-off or the like.

Figure 6:
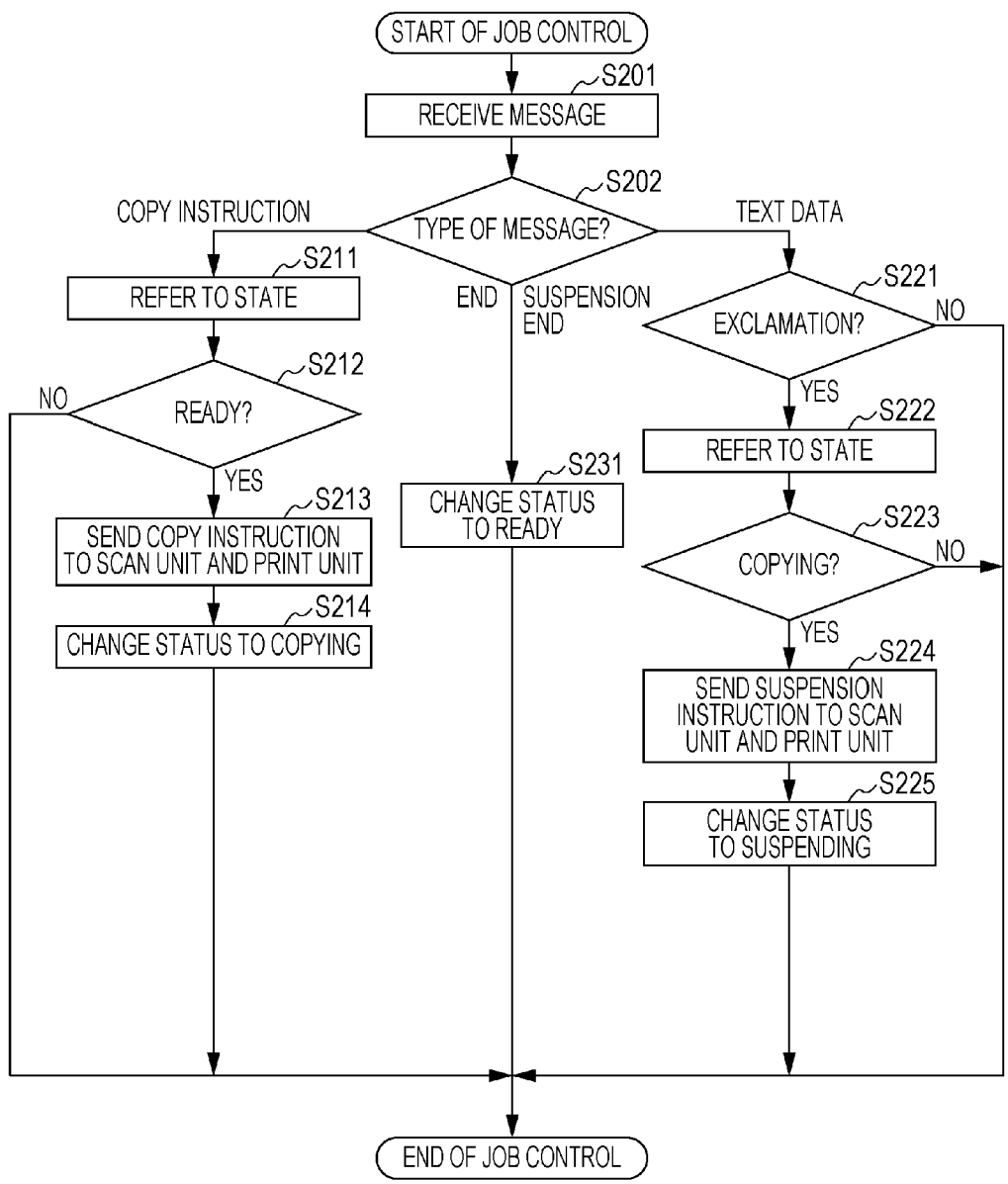
FIG. 6 is a flowchart illustrating details of "job control" illustrated as a step in FIG. 5.

FIG. 6 is a flowchart illustrating details of the "job control" illustrated as a step in FIG. 5.

First, the job control unit 16 receives a message (step S201).

Types of the message received in this step include a copy instruction (see FIG. 2) from the operation panel 15, an end notification (see FIG. 2) from the scan unit 11 and the print unit 12, and a text data item (see FIG. 3) from the sound recognition unit 14, and a suspension end notification (see FIG. 3) from the scan unit 11 and the print unit 12.

Upon receipt of a message in step S201, the job control unit 16 determines the type of the received message (step S202). If the received message is a copy instruction, the process proceeds to step S211.

The job control unit 16 refers to the current state (step S211) and determines whether the current state is "Ready" among the states such as "Ready" and "Copying" (step S212). If the current state is "Ready" (YES in step S212), the job control unit 16 sends the copy instruction to the scan unit 11 and the print unit 12 (see FIG. 2) (step S213) and changes the state to "Copying" (step S214). If it is determined that the current state is not "Ready" (NO in step S212), the job control unit 16 ends the flow illustrated in FIG. 6 without performing any further processing. Note that, as illustrated in FIG. 5, the flow illustrated in FIG. 6 is repeatedly performed every time a new message is received.

If it is determined in step S202 that the message received this time is a text data item sent from the sound recognition unit 14, the process proceeds to step S221. In step S221, the job control unit 16 determines whether the text data item received as the message matches any one of (text data items of) the plural exclamations stored in the exclamation database 17 (see FIG. 1). If the received text data item matches any one of the stored text data items (YES in step S221), the job control unit 16 refers to the current state (step S222) and determines whether the current state is "Copying" (step S223). If the current state is "Copying" (YES in step S223), the job control unit 16 sends an instruction to suspend the operation to the scan unit 11 and the print unit 12 (step S224) and changes the state to "Suspending" (step S225). If it is determined that the text data item received as the message matches none of the plural text data items stored in the exclamation database 17 (NO in step S221) or if it is determined that the current state is not "Copying" (NO in step S223), the job control unit 16 ends the flow illustrated in FIG. 6.

If it is determined in step S202 that the message received this time is an end notification (see FIG. 2) or a suspension end notification (see FIG. 3), the process proceeds to step S231, in which the job control unit 16 changes the state to "Ready". In the cases of the end notification and the suspension end notification, the internal state enters "Ready"; however, the contents displayed on the operation panel 15 slightly differ. When the end notification is received, the screen illustrated in FIG. 4B, which indicates the state "Copying", is changed to the screen illustrated in FIG. 4A, which indicates the state "Ready". In contrast, when the suspension end notification is received, the screen illustrated in FIG. 4C, which indicates "Suspending", is changed to the state illustrated in FIG. 4D where "Copy has been suspended." is displayed, and, after a while, to the screen illustrated in FIG. 4A, which indicates "Ready".

The copier 10A according to the first exemplary embodiment minimizes a damage of the copier 10A or the number of wasted sheets because the operation is suspended in response to a user's spontaneous utterance.

The overview of second and following exemplary embodiments will be described below.

The second and following exemplary embodiments will be described below in terms of differences from the first exemplary embodiment by using drawings clearly illustrating differences from the first exemplary embodiment described above.

A copier, which is a processing apparatus according to the second exemplary embodiment of the present invention, will be described first. The copier according to the second exemplary embodiment differs from the copier 10A, which has been described in the first exemplary embodiment with reference to FIGS. 1 to 6, only in the configurations illustrated in FIGS. 3 and 6. Accordingly, FIGS. 1, 2, 4A-4D, and 5 are also used to describe the copier according to the second exemplary embodiment.

Figure 7:
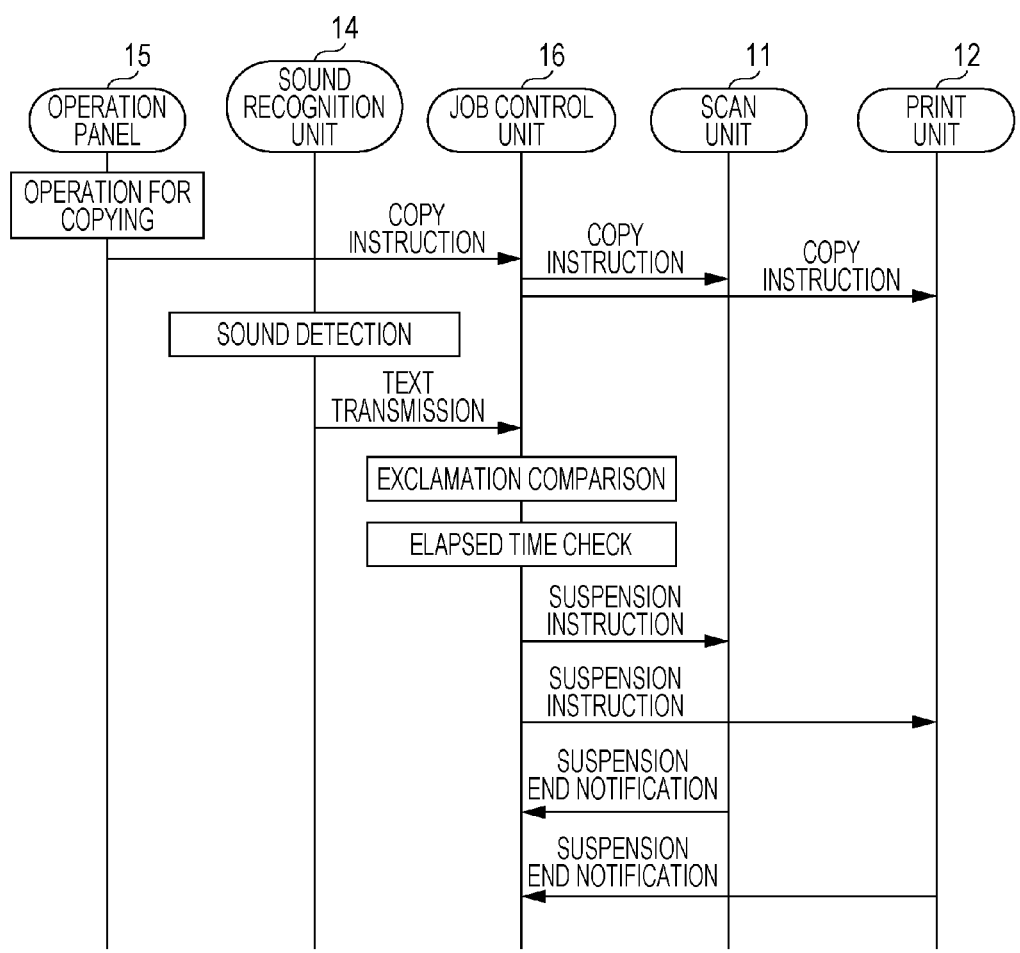
FIG. 7 is a ladder chart of the case where a copier, which is a processing apparatus according to a second exemplary embodiment, detects a sound during the operation.

FIG. 7 is a ladder chart of the case where the copier according to the second exemplary embodiment detects a sound during the operation.

Figure 8:
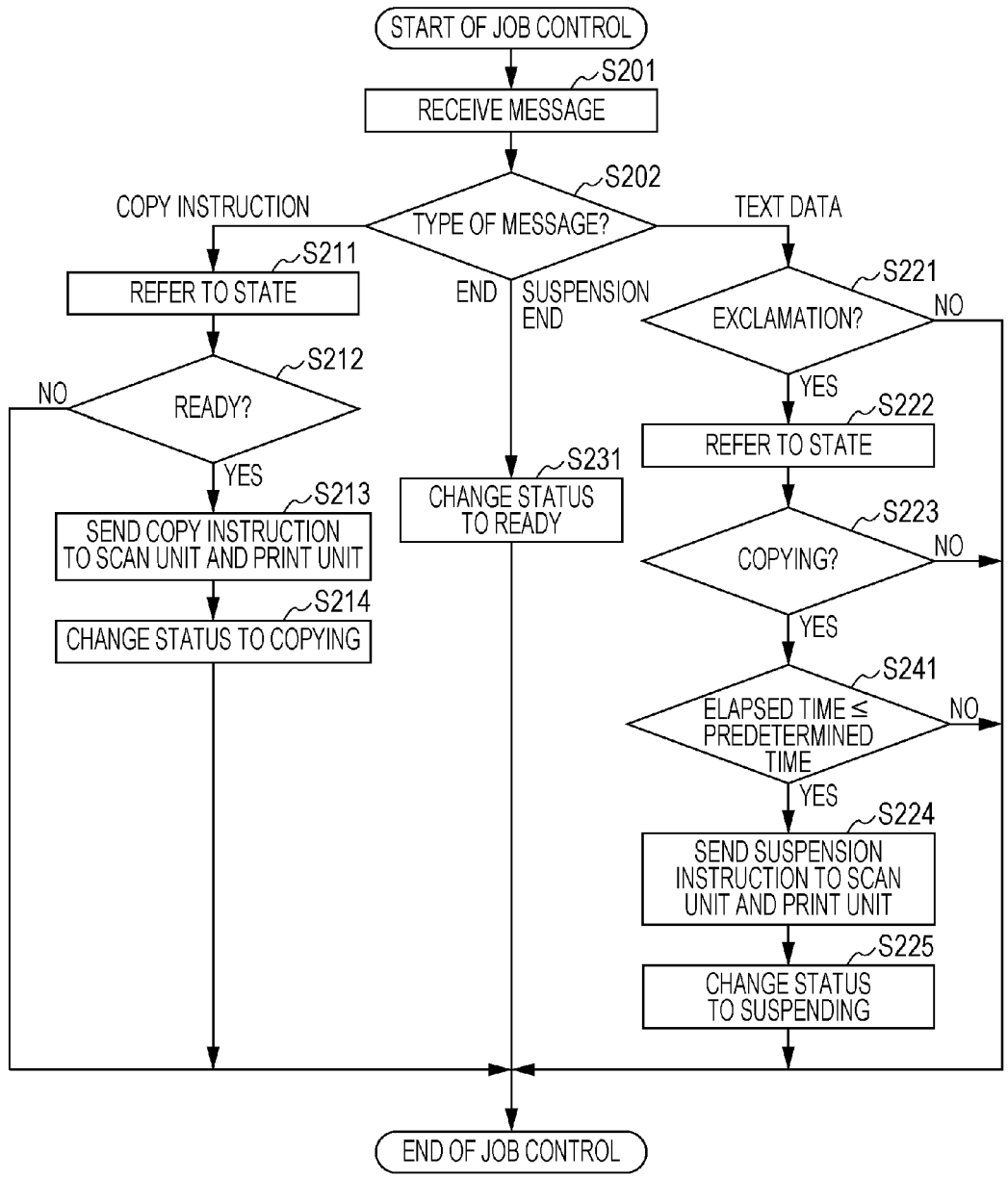
FIG. 8 is a flowchart illustrating details of "job control" performed by a job control unit of the copier according to the second exemplary embodiment.

FIG. 8 is a flowchart illustrating details of "job control" performed by the job control unit 16 of the copier according to the second exemplary embodiment.

FIGS. 7 and 8 respectively correspond to FIGS. 3 and 6 for the copier 10A according to the first exemplary embodiment described above.

The ladder chart illustrated in FIG. 7 additionally includes "elapsed time check" after "exclamation comparison", compared with the ladder chart of FIG. 3.

The detailed flow illustrated in FIG. 8 additionally includes a step of determining whether an elapsed time is less than or equal to a predetermined time (step S241), after a step of determining whether the current state is copying (step S223).

Specifically, in the case of the copier according to the second exemplary embodiment, if the text data item received from the sound recognition unit 14 matches any one of the plural text data items stored in the exclamation database 17, it is determined whether an elapsed time from the start of this copy operation, that is, from when the job control unit 16 has sent the copy instruction to the scan unit 11 and the print unit 12, is less than or equal to a predetermined time. A suspension instruction is given to the scan unit 11 and the print unit 12 only in the case where the elapsed time is less than or equal to the predetermined time. The possibility of requiring the suspension instruction is the highest immediately after the start of the copy operation, and suspension often becomes more meaningless as the time passes. Accordingly, unnecessary suspension due to erroneous voice detection is suppressed by limiting a period for which a sound-based suspension instruction is accepted.

A copier according to a third exemplary embodiment of the present invention will be described next.

The copier according to the third exemplary embodiment differs from the copier 10A according to the first exemplary embodiment, which has been described with reference to FIGS. 1 to 6, only in the configuration illustrated in FIG. 4D. Accordingly, FIGS. 1 to 6 except for FIG. 4D are used for the description of the copier according to the third exemplary embodiment.

Figure 9:
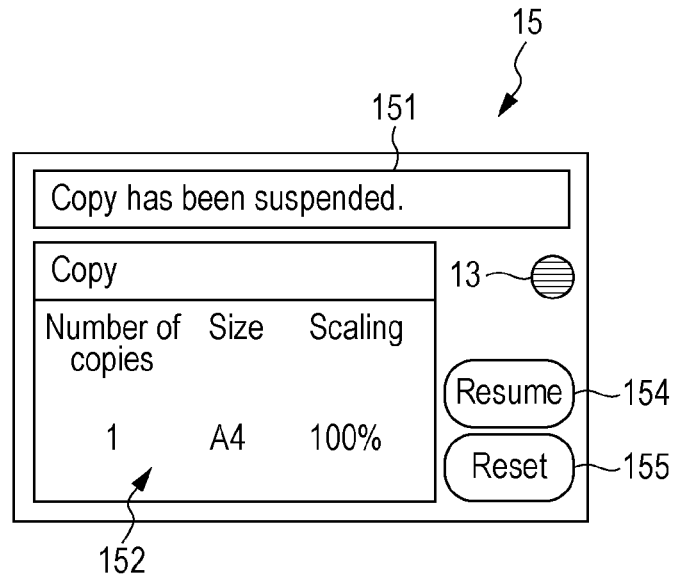
FIG. 9 illustrates a screen displayed on an operation panel of a copier, which is a processing apparatus according to a third exemplary embodiment of the present invention, in the case of suspension end.

FIG. 9 illustrates a screen displayed on the operation panel 15 of the copier according to the third exemplary embodiment of the present invention in the case of suspension end. FIG. 9 corresponds to FIG. 4D of the first exemplary embodiment described above.

In the first exemplary embodiment described above, when the job control unit 16 receives a suspension end notification, the screen illustrated in FIG. 4D is temporarily displayed on the operation panel 15 to notify the user that the copy operation has been suspended. After a predetermined period passes, the screen changes to the one displaying "Ready" illustrated in FIG. 4A.

In contrast, in the case of the copier according to the third exemplary embodiment, when the job control unit 16 receives a suspension end notification, the screen illustrated in FIG. 9 is displayed on the operation panel 15. The screen illustrated in FIG. 9 includes a "Resume" button 154 and a "Reset" button 155. When the "Resume" button 154 is pressed, the suspended copy operation is resumed, and the copy operation is performed from the part following the part that has been processed before the suspension.

In contrast, when the "Reset" button 155 is pressed, the operator has no intention to continue the suspended process. Accordingly, the screen changes to the screen illustrated in FIG. 4A for "Ready". Note that the screen illustrated in FIG. 9 is not displayed permanently. For example, after elapse of a certain period that is long enough to assume that the operator who has given an instruction for the suspended copy operation has left the copier without resuming the copy operation, the screen changes to the screen illustrated in FIG. 4A for "Ready".

According to the copier according to the third exemplary embodiment, a temporarily suspended process may be resumed, and a circumstance where the copy operation is suspended, for example, due to erroneous voice recognition against the intention of the operator may be addressed.

In the third exemplary embodiment, the operator needs to operate a button (press the "Resume" button 154 or the "Reset" button 155 illustrated in FIG. 9) after the job is suspended. Accordingly, operators who feel this operation irritating are taken into account. Specifically, a configuration may be made such that a mode in which the operation is not resumed after the suspension as in the first exemplary embodiment and a mode in which the operation is to be resumed as in the third exemplary embodiment are switched between in accordance with a setting of an internal parameter of the copier.

A description of fourth and following exemplary embodiments is continued below. In each of the fourth and following exemplary embodiments, differences from the first exemplary embodiment will be described by using a block diagram corresponding to the block diagram of FIG. 1 according to the first exemplary embodiment.

Figure 10:
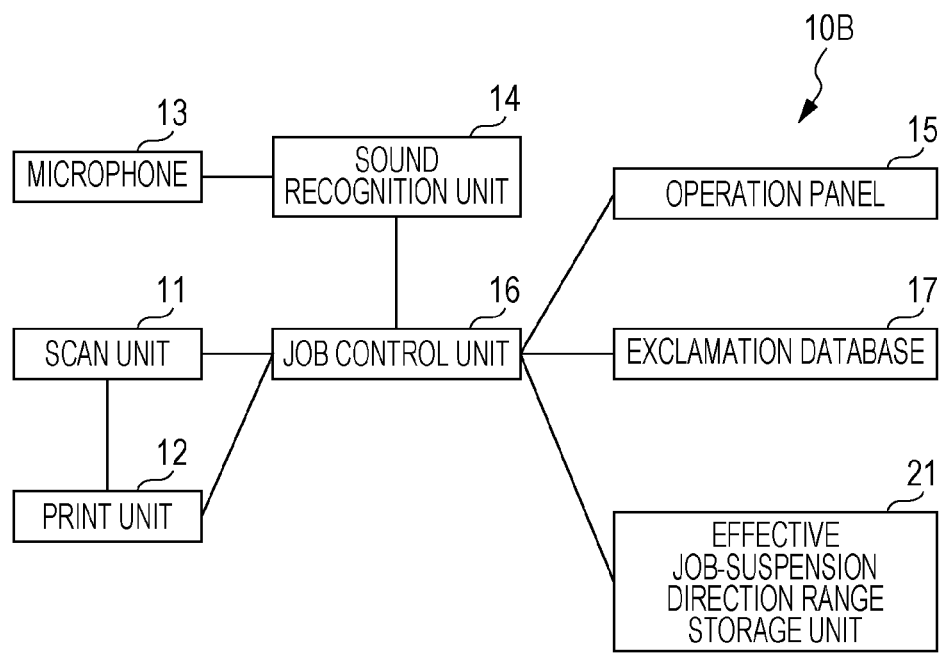
FIG. 10 is a block diagram illustrating a configuration of a copier, which is a processing apparatus according to a fourth exemplary embodiment of the present invention.

FIG. 10 is a block diagram illustrating a configuration of a copier 10B, which is a processing apparatus according to the fourth exemplary embodiment of the present invention. Components corresponding to the components of the copier 10A according to the first exemplary embodiment illustrated in FIG. 1 are denoted by the same or substantially the same reference signs used in FIG. 1, and only differences are described. The same applies to each of the following exemplary embodiments illustrated in FIG. 11 and the following figures.

In the case of the copier 10B illustrated in FIG. 10, the microphone 13 includes plural sound sensors and is capable of detecting a direction of a speaker, that is, a direction from which a sound emanates (hereinafter, referred to as a sound-emanating direction). The sound recognition unit 14 of the copier 10B illustrated in FIG. 10 generates a text data item that has, as its attribute, information about the sound-emanating direction detected by the microphone 13.

The copier 10B illustrated in FIG. 10 additionally includes an effective job-suspension direction range storage unit 21, compared with the copier 10A illustrated in FIG. 1. The effective job-suspension direction range storage unit 21 stores an effective range of the sound-emanating direction. A fixed effective range of the sound-emanating direction may be stored or the effective range of the sound-emanating direction may be adjusted for each copier 10B.

The job control unit 16 of the copier 10B illustrated in FIG. 10 performs control to stop the operation being performed by the processing unit (the scan unit 11 or the print unit 12) if the information about the sound-emanating direction added to the text data item derived from the sound detected by the microphone 13 while the processing unit (the scan unit 11 or the print unit 12) is operating indicates a sound-emanating direction that is within the effective range of the sound-emanating direction stored in the effective job-suspension direction range storage unit 21 and a text data item that matches the text data item derived from the sound detected by the microphone 13 is found among the plural text data items stored in the exclamation database 17. That is, in the case of the copier 10B illustrated in FIG. 10, the direction from which a sound emanates is additionally determined in step S221 of the flow illustrated in FIG. 6. Note that other copiers 10C and 10D described below also additionally determine a condition in step S221.

The copier 10B according to the fourth exemplary embodiment illustrated in FIG. 10 limits the effective range of the sound-emanating direction to a range in which the user who is using the copier 10B is usually located. In this way, urgent suspension in response to an utterance of a person other than the user may be suppressed.

Figure 11:
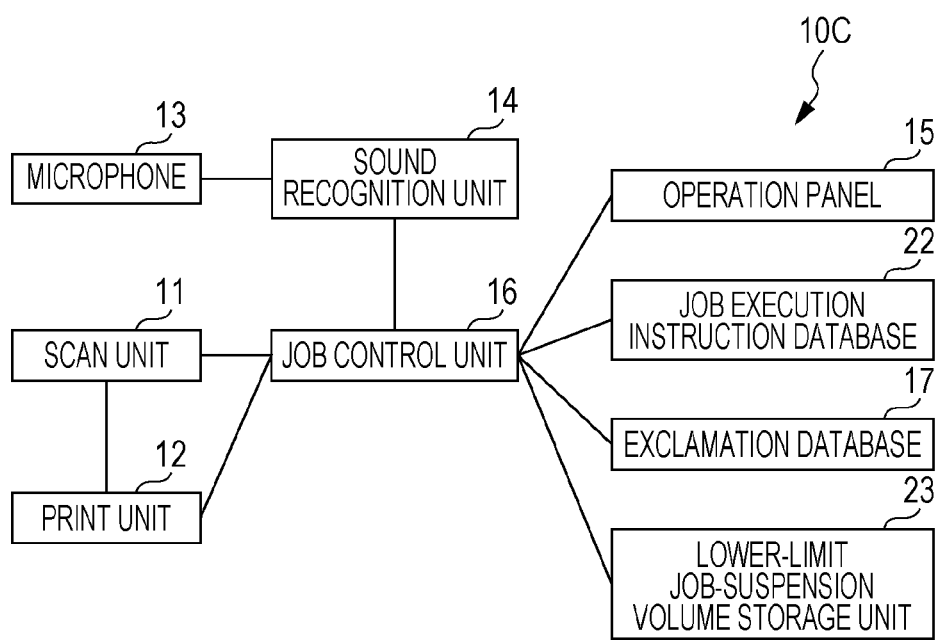
FIG. 11 is a block diagram illustrating a configuration of a copier, which is a processing apparatus according to a fifth exemplary embodiment of the present invention.

FIG. 11 is a block diagram illustrating a configuration of the copier 10C, which is a processing apparatus according to a fifth exemplary embodiment of the present invention.

The copier 10C illustrated in FIG. 11 further includes a job execution instruction database 22 and a lower-limit job-suspension volume storage unit 23 in addition to the components of the copier 10A illustrated in FIG. 1.

The job execution instruction database 22 stores text data items used in copy operation instructions for the copier 10C. Specifically, the job execution instruction database 22 stores text data items that represent instructions regarding the "number of copies", the "size" of the sheet, the "scaling" of the image, and a start instruction corresponding to pressing of the start button 153 illustrated in FIGS. 4A to 4D.

The lower-limit job-suspension volume storage unit 23 stores the lower-limit volume value of a sound for an operation suspension instruction. The lower-limit job-suspension volume storage unit 23 may store a fixed lower-limit volume value in advance or the stored lower-limit volume value may be changed through an operation on the operation panel 15.

The sound recognition unit 14 of the copier 10C illustrated in FIG. 11 recognizes a representative volume, for example, an average volume or a peak volume, on the basis of the audio signal generated by the microphone 13 and generates a text data item to which information about the volume is added.

The job control unit 16 receives the text data item from the sound recognition unit 14 and determines whether the current state is "Ready", "Copying", or "Suspending". In the case of "Suspending", the text data item is ignored. In the case of "Ready", the job control unit 16 searches the job execution instruction database 22. If a text data item that matches the text data item received from the sound recognition unit 14 is found, the job control unit 16 performs control to display the found text data item on the operation panel 15. For example, in the case of a text data item representing "3 copies", the "number of copies" displayed on the operation panel 15 in the "Ready" state illustrated in FIG. 4A is changed to "3". In this way, the user gives an instruction regarding settings of copying by voice and checks content displayed on the operation panel 15. The user is allowed to change the settings of copying not only by a sound but also by manually operating the operation panel 15. The user checks the content displayed on the operation panel 15, and if the user confirms the content, the user presses the start button 153 or says "Start". If the user says "Start", the job control unit 16 searches the job execution instruction database 22 for this text data item for "Start". Consequently, the copy operation is started.

If the state at which the job control unit 16 receives the text data item from the sound recognition unit 14 is "Copying", the job control unit 16 extracts information regarding the volume added to the text data item received from the sound recognition unit 14 and determines whether the volume exceeds the lower-limit volume value stored in the lower-limit job-suspension volume storage unit 23. If the volume represented by the information added to the text data item received from the sound recognition unit 14 is equal to or below the lower-limit volume value, the received text data item is ignored. In contrast, if the volume represented by the information added to the received text data item exceeds the lower-limit volume value, the job control unit 16 searches the exclamation database 17. If a text data item that matches the text data item received from the sound recognition unit 14 is found, the job control unit 16 sends an operation suspension instruction to the scan unit 11 and the print unit 12.

The copier 10C according to the fifth exemplary embodiment illustrated in FIG. 11 may avoid unintended urgent suspension due to erroneous recognition of a usual conversation and may urgently suspend the operation only in the case of loud voice.

Figure 12:
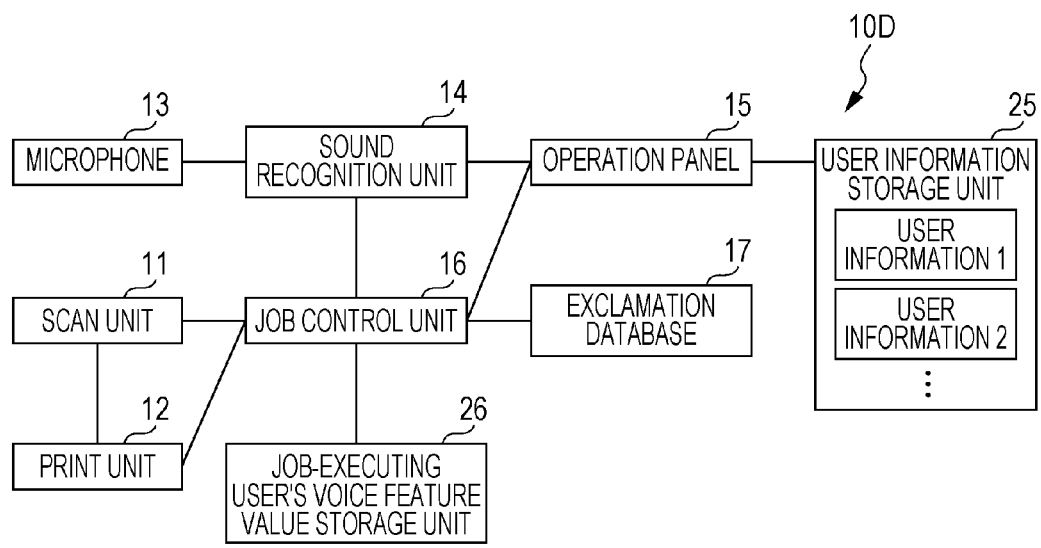
FIG. 12 is a block diagram illustrating a configuration of a copier, which is a processing apparatus according to a sixth exemplary embodiment of the present invention.

FIG. 12 is a block diagram illustrating a configuration of the copier 10D, which is a processing apparatus according to a sixth exemplary embodiment of the present invention.

The copier 10D according to the sixth exemplary embodiment illustrated in FIG. 12 additionally includes a user information storage unit 25 and a job-executing user's voice feature value storage unit 26 in addition to the components of the copier 10A illustrated in FIG. 1.

The user information storage unit 25 stores a user information list about people who are possible users of the copier 10D.

Figure 13:
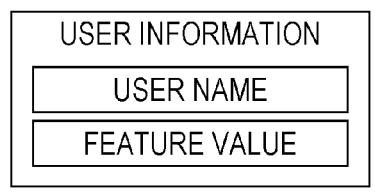
FIG. 13 illustrates an example of user information.

FIG. 13 illustrates one piece of user information.

Each piece of user information includes a pair of a "user name" and a "feature value". The "user name" is a name of a person who is a possible user permitted to use the copier 10D. The "feature value" is a feature value, such as voiceprint, representing a feature of voice of a person who is a possible user. The user information storage unit 25 illustrated in FIG. 12 stores in advance, for all possible users of the copier 10D, user information including the "user name" and the "feature value".

Figure 14:
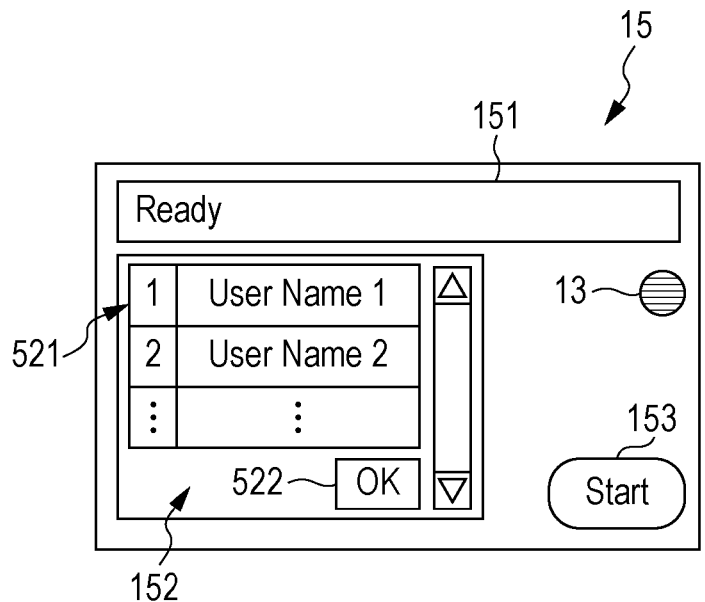
FIG. 14 illustrates an initial screen displayed on an operation panel of the copier illustrated in FIG. 12 in a "ready" state.

FIG. 14 illustrates an initial screen displayed on the operation panel 15 of the copier 10D illustrated in FIG. 12 in the "Ready" state.

In this initial screen displayed on the operation panel 15 illustrated in FIG. 14, a user name list 521 is displayed in the instruction accepting portion 152. The user who is to use the copier 10D first presses their name from the user name list 521 and presses an "OK" button 522. Then, the job control unit 16 extracts the voice feature value associated with the user name specified by the operation performed on the operation panel 15 from the user information storage unit 25 and stores the feature value in the job-executing user's voice feature value storage unit 26. In addition, the operation panel 15 changes the screen to the screen for setting details of copying illustrated in FIG. 4A in response to specifying of the user name.

The sound recognition unit 14 of the copier 10D illustrated in FIG. 12 recognizes a sound and extracts a feature value of voice on the basis of the audio signal generated by the microphone 13 and generates a text data item having attribute information regarding the extracted feature value of voice.

The job control unit 16 receives the voice-feature-value-attached text data item from the sound recognition unit 14. If the current state is "Copying", the job control unit 16 compares the feature value represented by the attribute information added to the text data with the feature value stored in the job-executing user's voice feature value storage unit 26. Then, it is determined whether the text data item received from the sound recognition unit 14 is generated based on a sound made by the current user. If the received text data item is generated based on a sound made by the current user, the job control unit 16 searches the exclamation database 17. If a text data item that matches the text data item is found in the exclamation database 17, the job control unit 16 sends an operation suspension instruction to the scan unit 11 and the print unit 12.

The copier 10D according to the sixth exemplary embodiment illustrated in FIG. 12 urgently suspends the operation only in response to voice of the user currently using the copier 10D. Thus, the copier 10D may avoid an erroneous operation based on voice of another person located nearby.

Figure 15:
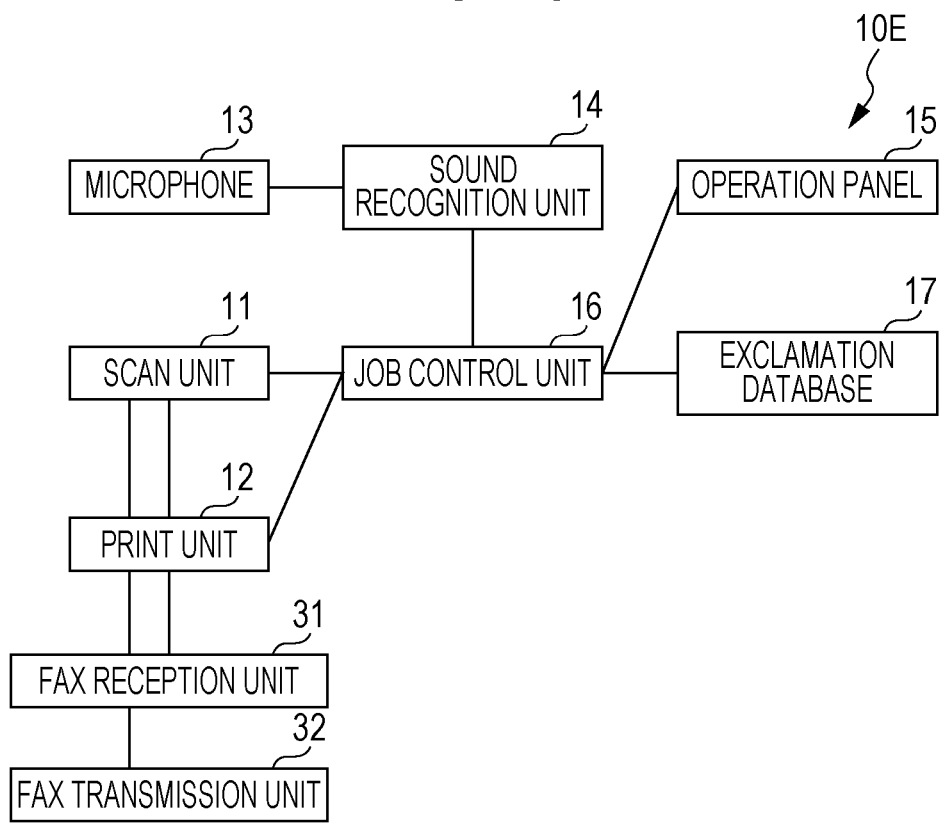
FIG. 15 is a block diagram illustrating a configuration of a multifunction printer, which is a processing apparatus according to a seventh exemplary embodiment of the present invention.

FIG. 15 is a block diagram illustrating a configuration of a multifunction printer 10E, which is a processing apparatus according to a seventh exemplary embodiment of the present invention.

The multifunction printer 10E according to the seventh exemplary embodiment illustrated in FIG. 15 additionally includes a fax reception unit 31 and a fax transmission unit 32 in addition to the components of the copier 10A illustrated in FIG. 1.

The fax reception unit 31 has a function of receiving image data transmitted by fax via a telephone line (not illustrated). The image data received by the fax reception unit 31 is input to the print unit 12, and an image based on the image data is printed on a sheet by the print unit 12.

The fax transmission unit 32 has a function of receiving from the scan unit 11 image data, which is obtained as a result of the scan unit 11 scanning an image on an original for fax transmission, and transmitting the image data to a specified destination via a telephone line (not illustrated).

Note that the fax reception unit 31 receives image data by fax and the print unit 12 prints (outputs) an image based on the received image data without an operator's instruction to start the process (for example, without pressing the start button 153 (see FIGS. 4A-4D) of the operation panel 15).

The multifunction printer 10E according to the seventh exemplary embodiment does not perform a sound-based suspension process for fax reception and printing, which are performed without an operator's instruction because of the following reasons. The necessity of suspending the process is low. Since the operator is not located in the vicinity of the multifunction printer 10E in this case, if the process is suspended in response to a sound, such suspension is based on erroneous detection of a sound made by a person other than the operator who is not located there.

While the various exemplary embodiments have been described above, combinations of plural exemplary embodiments from among these exemplary embodiments may also be exemplary embodiments of the present invention. That is, for example, both the effective range of the sound-emanating direction and the lower-limit volume value may be set.

In addition, the description has been given by using the copier or the multifunction printer as an example; however, the present invention is not exclusively applied to the copier and the multifunction printer and may also be applied to a scanner including the scan unit 11 among the scan unit 11 and the print unit 12 and to a printer including the print unit 12 among the scan unit 11 and the print unit 12. In addition, the present invention may be applied to, for example, a fax machine.

Further, the present invention may be applied to, for example, a personal computer or a smartphone having an email transmission function or a telephone function. In addition, the present invention may be applied to various situations, such as suspending a transaction via the Internet or suspending power shut-down.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing apparatus comprising:
    a processing unit that performs a process that is predetermined;
    an instruction unit that gives an instruction to start the process to the processing unit;
    a detection unit that detects a sound in the vicinity of the processing apparatus; and
    a suspension unit that suspends the process in a case where the detection unit detects a predetermined sound within a predetermined period since the start of the process and while the processing unit is performing the process.

2. The processing apparatus according to claim 1, wherein the suspension unit does not suspend the process in a case where the detection unit detects the predetermined sound after the predetermined period has passed since the start of the process.

3. The processing apparatus according to claim 1, wherein the processing unit performs a first process which the processing unit starts in response to an instruction from the instruction unit and a second process which the processing unit starts without an instruction from the instruction unit, and
    wherein the suspension unit does not suspend the second process.

4. The processing apparatus according to claim 1, wherein the suspension unit suspends the process in a case where the detection unit detects the predetermined sound at a volume greater than a predetermined volume.

5. The processing apparatus according to claim 1, wherein the predetermined sound is a sound from which an intention to suspend the process is estimated.

6. The processing apparatus according to claim 1, wherein the detection unit detects the sound and a direction from which the sound emanates, and
    wherein the suspension unit suspends the process in a case where the direction from which the predetermined sound emanates, the direction being detected by the detection unit, is a predetermined direction.

7. The processing apparatus according to claim 1, further comprising
    a recognition unit that recognizes a sound detected by the detection unit, wherein
    the suspension unit suspends the process in a case where the sound recognized by the recognition unit is the predetermined sound.

8. The processing apparatus according to claim 1, further comprising
    a resuming unit that resumes the process suspended by the suspension unit.

9. The processing apparatus according to claim 1, further comprising
    an identification unit that identifies a person who has made the sound detected by the detection unit and identifies whether the person is identical to an operator who has caused the instruction unit to give the instruction, wherein
    the suspension unit suspends the process in a case where the identification unit identifies that the person is identical to the operator.

10. A processing method comprising:
    performing a process that is predetermined;
    giving an instruction to start the process;
    detecting a sound made nearby; and
    suspending the process in a case where a predetermined sound is detected within a predetermined period since the start of the process while the process is being performed.

* * * * *